US010819585B2

United States Patent
Yang et al.

(10) Patent No.: US 10,819,585 B2
(45) Date of Patent: Oct. 27, 2020

(54) DETERMINING RACH ROOT SEQUENCES AS A FUNCTION OF ACCESS POINT CONFIGURATION USING GRAPH COLORING

(71) Applicant: AT&T Intellectual Property I, L.P., Atlanta, GA (US)

(72) Inventors: Yuning Yang, Basking Ridge, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 519 days.

(21) Appl. No.: 15/146,499

(22) Filed: May 4, 2016

(65) Prior Publication Data
US 2017/0324623 A1     Nov. 9, 2017

(51) Int. Cl.
*H04L 12/24* (2006.01)
*H04W 74/08* (2009.01)

(52) U.S. Cl.
CPC .............. *H04L 41/22* (2013.01); *H04L 41/12* (2013.01); *H04W 74/08* (2013.01)

(58) Field of Classification Search
CPC ......... H04L 41/22; H04L 41/12; H04W 74/08
See application file for complete search history.

(56) References Cited

U.S. PATENT DOCUMENTS

| 6,950,418 | B1 * | 9/2005 | Young | H04W 16/14 370/314 |
| 7,042,846 | B2 * | 5/2006 | Bauer | H04L 45/04 370/238 |
| 7,430,189 | B2 * | 9/2008 | Bejerano | H04W 16/00 370/332 |
| 8,095,143 | B2 | 1/2012 | Amirijoo et al. | |
| 8,526,996 | B2 | 9/2013 | Amirijoo et al. | |
| 8,531,956 | B2 * | 9/2013 | Lee | H04W 16/04 370/235 |
| 8,559,993 | B2 | 10/2013 | Madan et al. | |
| 8,600,394 | B2 * | 12/2013 | Auer | H04W 16/10 370/329 |
| 8,619,634 | B2 * | 12/2013 | Meier | H04W 72/082 370/256 |
| 8,879,412 | B2 | 11/2014 | Queseth et al. | |
| 8,989,050 | B2 | 3/2015 | Cavalcante et al. | |

(Continued)

OTHER PUBLICATIONS

Chernov, et al., "Anomaly Detection Algorithms for the Sleeping Cell Detection in LTE Networks," Proceedings of IEEE 81st Vehicular Technology Conference, VTC Spring 2015, 6 pages.

(Continued)

*Primary Examiner* — Huy D Vu
*Assistant Examiner* — Bailor C. Hsu
(74) *Attorney, Agent, or Firm* — Amin, Turocy & Watson, LLP

(57) ABSTRACT

A network device that determines RACH root sequences for AP devices within a given market. The network device can utilize a specialized graph coloring process or algorithm that has been adapted to, e.g., ensure that no two neighboring AP devices share the same RACH root sequences, provided certain additional constraints not found in graph coloring theory are met. For example, AP devices can have multiple RACH root sequence, whereas in traditional graph coloring problems, each vertex typically has only one color.

20 Claims, 10 Drawing Sheets

EXAMPLE NUMBER OF RACH ROOT SEQUENCES ASSIGNED AS A FUNCTION OF COMMUNICATION RANGE

500

| AP Device Communication Range (km) | Number of RACH Root Sequences |
|---|---|
| 1 | 1 |
| 2 - 3 | 2 |
| 4 - 6 | 3 |
| 6 | 4 |
| 7 - 8 | 5 |
| 9 - 10 | 6 |
| 11 - 12 | 8 |
| 13 - 16 | 10 |
| 17 - 23 | 13 |
| 24 - 39 | 22 |
| 40 - 59 | 32 |
| 60 - 100 | 64 |

(56) References Cited

U.S. PATENT DOCUMENTS

| | | | |
|---|---|---|---|
| 9,055,528 B2* | 6/2015 | Shukair | H04W 74/0833 |
| 9,130,732 B2* | 9/2015 | Guo | H04W 16/22 |
| 9,191,851 B2 | 11/2015 | Teyeb et al. | |
| 9,345,049 B1* | 5/2016 | Sitaram | H04J 13/16 |
| 9,692,705 B1* | 6/2017 | Zhou | H04L 45/54 |
| 9,949,274 B2* | 4/2018 | Savoor | H04L 41/5019 |
| 2008/0002725 A1* | 1/2008 | Alicherry | H04L 45/04 |
| | | | 370/401 |
| 2009/0303239 A1* | 12/2009 | Ang | G06F 17/30554 |
| | | | 345/440 |
| 2010/0284350 A1* | 11/2010 | Korhonen | H04J 13/16 |
| | | | 370/329 |
| 2011/0086636 A1* | 4/2011 | Lin | H04W 24/02 |
| | | | 455/434 |
| 2014/0120955 A1* | 5/2014 | Padden | H04W 36/00 |
| | | | 455/456.6 |
| 2014/0211606 A1 | 7/2014 | Bergman et al. | |
| 2014/0348121 A1 | 11/2014 | Su et al. | |
| 2015/0078264 A1* | 3/2015 | Han | H04W 74/0833 |
| | | | 370/329 |
| 2015/0124644 A1* | 5/2015 | Pani | H04L 41/082 |
| | | | 370/254 |
| 2015/0351116 A1 | 12/2015 | Shoshan et al. | |
| 2016/0353486 A1* | 12/2016 | Xia | H04W 72/044 |

OTHER PUBLICATIONS

Chernogorov, et al., "Sequence-based Detection of Sleeping Cell Failures in Mobile Networks," Last Accessed: Aug. 4, 2016, 26 pages.

* cited by examiner

EXAMPLE GRAPH WITH
VERTICES 202 THAT REPRESENT
RESPECTIVE ACCESS POINT
DEVICES 102

EXAMPLE VERTEX COLORS 206

206A ▪ - BLACK
206B ▪ - DARK GRAY
206C ▫ - LIGHT GRAY

EXAMPLE NUMBER OF RACH ROOT SEQUENCES ASSIGNED AS A FUNCTION OF COMMUNICATION RANGE

| AP Device Communication Range (km) | Number of RACH Root Sequences |
|---|---|
| 1 | 1 |
| 2 - 3 | 2 |
| 4 - 5 | 3 |
| 6 | 4 |
| 7 - 8 | 6 |
| 9 - 10 | 8 |
| 11 - 12 | 10 |
| 13 - 16 | 19 |
| 17 - 23 | 22 |
| 24 - 39 | 32 |
| 40 - 59 | 48 |
| 60 - 100 | 64 |

500

DETERMINING RACH ROOT SEQUENCES AS A FUNCTION OF ACCESS POINT CONFIGURATION USING GRAPH COLORING

TECHNICAL FIELD

The present application relates generally to the field of mobile communication and more specifically to utilizing graph coloring processes and/or other techniques that are adapted to determine random-access channel (RACH) root sequences for access point devices as a function of configuration of the access point devices.

BACKGROUND

In mobile communication networks today, mobile devices or other user equipment (UE) connect to the network by attaching to a particular access point (AP) device that provides network service to the UE. One of the services that can be provided to the UE is a RACH. RACH is a shared channel that can be used for voice communication as well as for so-called "bursty" data transmission.

To help facilitate use of RACH by serviced UE, AP devices broadcast system information that includes a RACH root sequence that represents the first root sequence number for RACH preamble generation. RACH root sequences can have integer values between 0-837 for a total of 838 possible different RACH root sequences.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
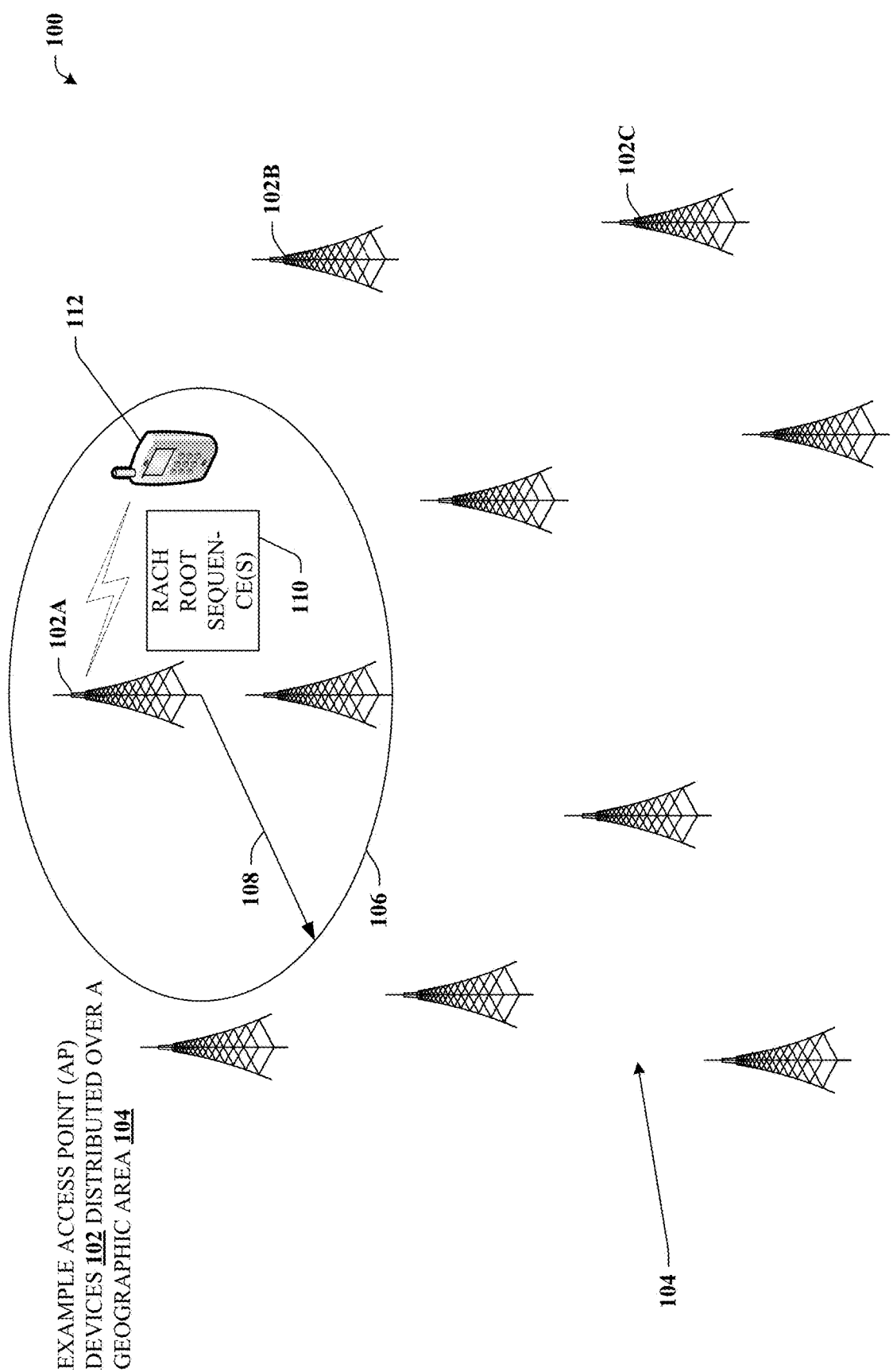
FIG. 1 illustrates a diagram of an example communication environment depicting an example of access point (AP) devices 102 distributed over a geographic area in accordance with certain embodiments of this disclosure.

If two or more AP devices have overlapping service areas, one consideration is to ensure that those AP devices do not use the same RACH root sequence in order to prevent false RACH detection or other conflict. However, because there are only 838 different RACH root sequences available for use, efficient RACH root planning can provide enhanced abilities to a network provider. For example, efficient RACH root planning can reduce a number of RACH access failures witnessed by subscribers. Difficulties associated with such planning are further compounded by the fact that AP devices can individually use multiple RACH root sequences. In some cases, the number of RACH root sequences used by a given AP device can be based on communication range (e.g., service area). For example, an AP device with a relatively small service area might use only one RACH root sequence whereas an AP device with a relatively large service area by comparison might use as many as 64 RACH root sequences.

Suppose an AP device is assigned a first RACH root sequence of 380 (e.g., in the range of 0-837) and is allocated ten RACH root sequences. In that case, the RACH root sequences used by that AP device are 380, 381, 382, 383, 384, 385, 386, 387, 388, and 389. Part of the RACH root sequence planning is to ensure that neighboring AP devices have enough code separation (e.g., RACH root sequence separation) to prevent overlap. In other words, allocation of the first RACH root sequence for neighboring AP devices should differ by at least ten and/or at most 827, given there is a wrap-around between the first value (e.g., "0") and the last value (e.g., "837") of the range.

In this regard, the disclosed subject matter can optimize or improve the reuse distance of the limited 838 RACH root sequence values. Such can be accomplished by leveraging a heuristic process or algorithm based on graph coloring theory. Unlike traditional graph coloring problems, which require only that two adjacent vertices have different colors, RACH root sequence planning requires two neighboring AP devices (e.g., AP devices that have overlapping service/coverage area) be allocated different RACH root sequences and have enough code separation on the RACH root sequences.

Further, the disclosed subject matter can 1) ensure that RACH root sequences assigned to neighboring AP devices have enough code separation (considering wrap-around) based on communication ranges and/or 2) improve or maximize reuse distance of RACH root sequences to further reduce the chance of false RACH detection or other conflicts or failures. In terms of technological and/or real-world network provider and/or end-user advantages, such improvements can provide a significant increase of RACH success rates as seen by users of a host communication network.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, system 100 is depicted illustrating an example of access point (AP) devices 102 distributed over a geographic area 104. As used herein, the AP devices 102 are referred to as eUtrancell devices that operate according to long term evolution (LTE) standards, but it is understood that AP devices 102 can be substantially any access point device (e.g., nodeB, base stations, etc.) that operate according to any suitable standard (e.g., third generation partnership project (3GPP), etc.). It is further understood that the techniques disclosed herein that relate to optimizing or improving RACH root sequence allocation can be applied to optimizing or improving planning or allocation of other suitable resources. Geographic area 104 can represent substantially any suitable area covered by a communication network with substantially any number of access point devices 102. In some embodiments, geographic area 104 can represent coverage area for an entire network or some subset thereof such as coverage area for a particular market (e.g., a city or population center or portion thereof) and can be bounded by either network-based classifications such as cell ID mapping or by third party classifications such as e.g., zip codes, territorial zones, etc.

FIG. 1 individually distinguishes three of the AP devices 102, labeled as AP devices 102A, 102B, and 102C, which are used herein to better impart the disclosed subject matter. AP devices 102 typically have a defined coverage area 106, which is illustrated with reference to AP device 102A. As depicted, an approximate radius 108 of coverage area 106 is referred to herein as communication range 108. A UE device(s) 112 within coverage area 106 of AP device 102A typically receives system information broadcast by AP device 102A that includes RACH root sequence 110 data. It is appreciated that UE device 112 might also receive similar information broadcast by other AP devices 102 (e.g., AP device 102B) provided UE device 112 is also in coverage areas of those other AP devices as well. Hence, it can be advantageous to improve or maximize of RACH root sequence reuse, which can be accomplished by implementing certain techniques associated with graph coloring theory, which is introduced at FIG. 2.

Figure 2:
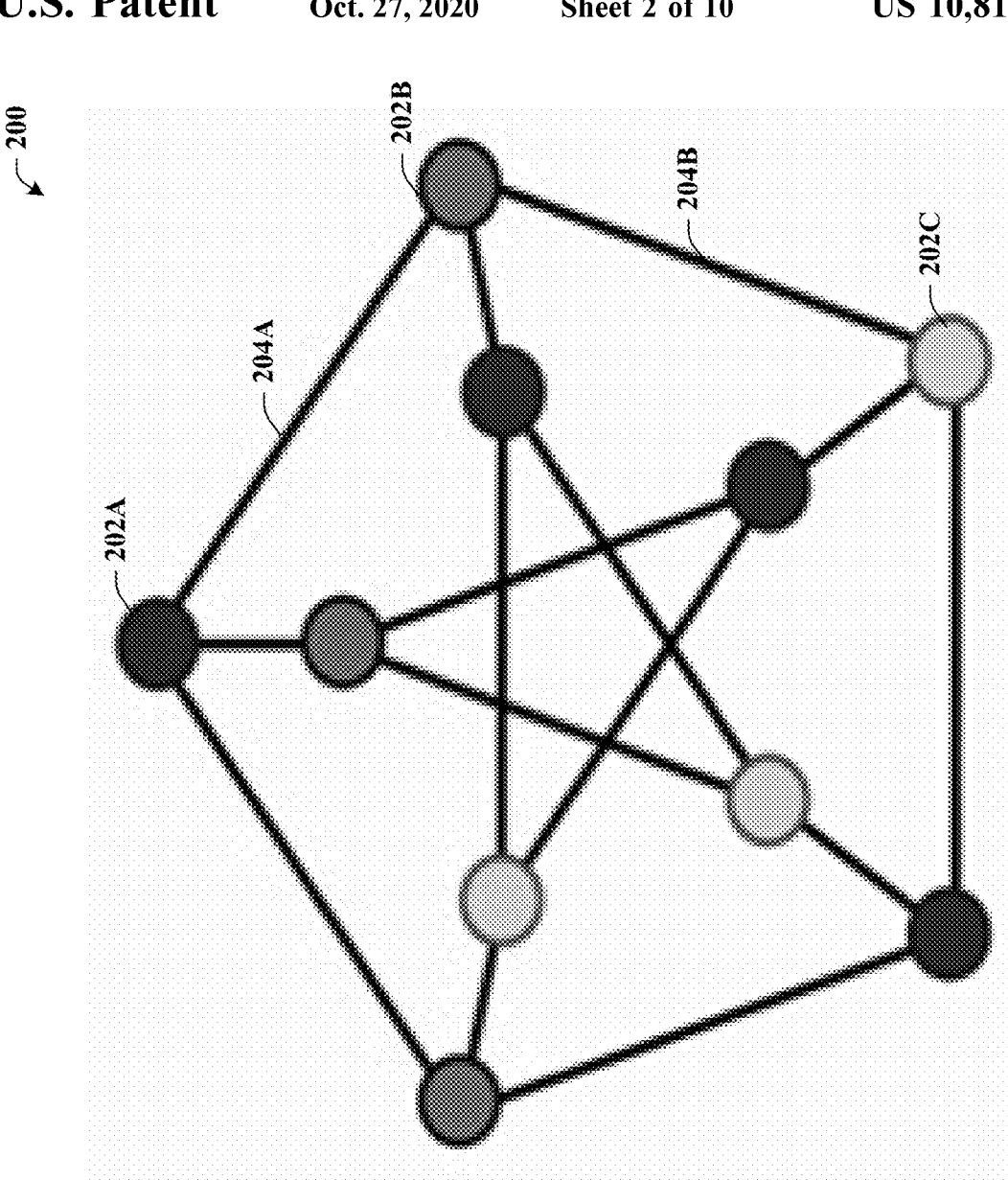
FIG. 2 illustrates a diagram of an example graph illustrated with vertices that represent respective AP devices and edges that represent a relationship between various pairs of the AP devices in accordance with certain embodiments of this disclosure.

Turning now to FIG. 2, example graph 200 is illustrated with vertices that represent respective AP devices 102. In graph 200, vertex 202A can represent AP device 102A, vertex 202B can represent AP device 102B, vertex 202C can represent AP device 102C, and so on. Any two vertices 202 that share an edge 204 are referred to herein as adjacent vertices, which is further detailed in connection with FIG. 3. For example, vertex 202A and vertex 202B are adjacent vertices since they share edge 204A. On the other hand, vertex 202A and vertex 202C are not adjacent vertices since they do not share any edge 204.

Graph 200 further depicts vertices 202 having various colors 206. In this example, three colors are depicted, which are black (206A), dark gray (206B), and light gray (206C), however, it is understood that graphs generated according to the disclosed subject matter will typically have many additional colors, generally up to a maximum of 838 and/or a maximum number of different RACH root sequences. For example, in some embodiments, such graphs will typically have 838 colors since communication networks allow for up to 838 RACH root sequences. It is further understood that colors 206 can be substantially any distinguishing label and is not restricted to vertex distinguishing based on color. In other words, the term color as used herein is intended to represent any suitable label or form of distinction. For example, vertices can be distinguished based on line thickness, dashed lines, crosshatch patterns, and so forth. In some embodiments, those different distinctions can be referred to herein as different colors.

Figure 3:
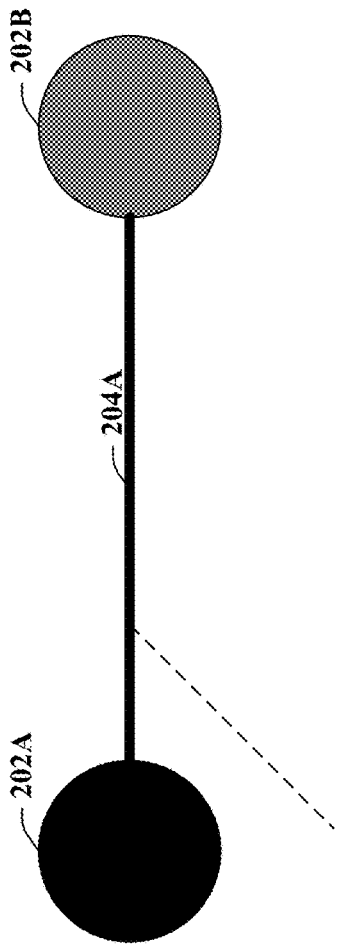
FIG. 3 depicts an example illustration that provides an example of adjacent vertices defined as sharing a common edge in accordance with certain embodiments of this disclosure.

While still referring to FIG. 2, but turning as well to FIG. 3, illustration 300 is presented. Illustration 300 depicts an example of adjacent vertices 202A, 202B, that share a common edge 204A. Traditional solutions to graph coloring problems exist when no two adjacent vertices 202 share the same color. Hence, graph coloring can be adapted to, e.g., ensure that no two neighboring AP devices 102 share the same RACH root sequences, provided certain additional constraints not found in graph coloring theory are met. For example, AP devices 102 (that are represented in graph 200 as vertices 202) can have multiple RACH root sequence, whereas in traditional graph coloring problems, each vertex typically has only one color.

Graph 200 can be generated by representing AP devices 102 as vertices 202 and edges 204 can connect certain vertices based on a relationship 302 that is determined to exist between AP devices 102. For example, if relationship 302 is determined to exist between AP device 102A and AP device 102B, then an edge can be drawn between vertex 202A (e.g., the vertex that represents AP device 102A) and vertex 202B (e.g., the vertex that represents AP device 102B).

In some embodiments, relationship 302 between two AP devices 102 can be determined to exist in various ways, which facilitates generating edge 204 between representative vertices 202. For example, relationship 302 can be determined to exist between AP device 102A and AP device 102B if or when, e.g., AP device 102A identifies AP device 102B in a neighbor list data structure or vice versa. As another example, relationship 302 can be determined to exist if or when, e.g., a physical distance between AP device 102A and AP device 102B is determined to be less than a defined minimum distance 304. Minimum distance 304 can be an adjustable parameter, as further detailed herein. Colors 206 can be assigned to vertices 202 to ensure that no two adjacent vertices 202 have the same color 206. As RACH root sequence used by AP devices 102 can be assigned based on color 206 of the associated vertex 202, assignment of color 206 to vertices 202, in turn, ensures that no two neighboring (e.g., in neighbor list and/or within minimum distance 304) AP devices 102 will have the same RACH root sequence.

Figure 4:
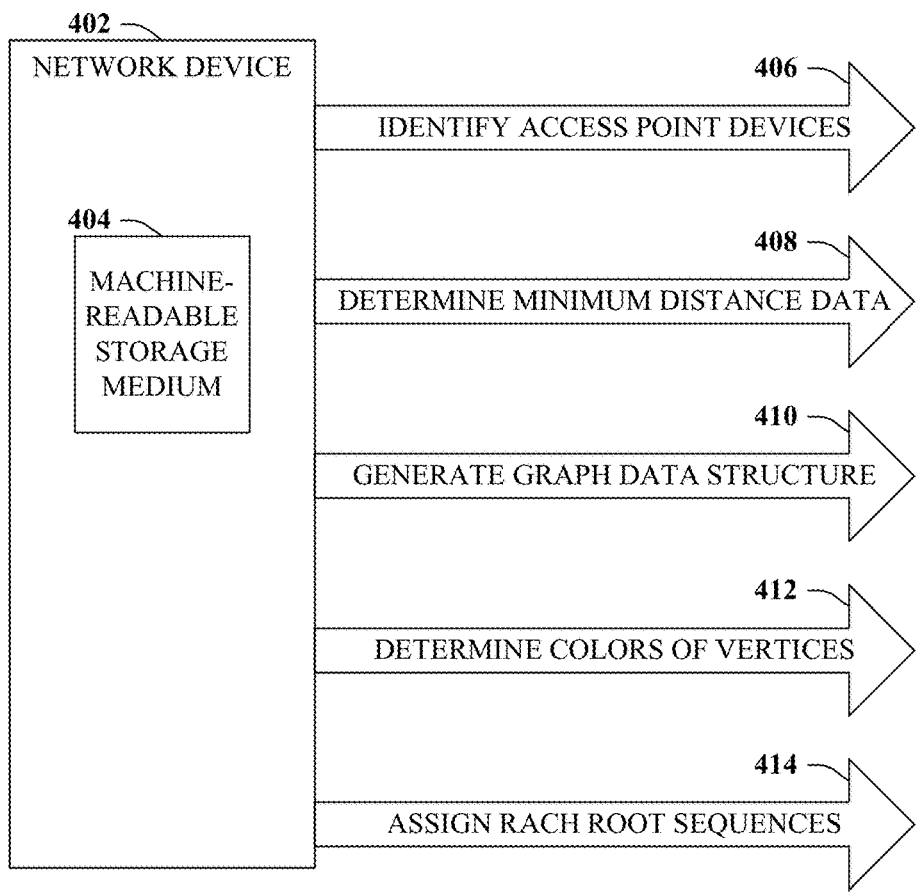
FIG. 4 depicts a block diagram of an example system that provides for assigning RACH root sequences to AP devices as a function of color of representative vertices of a graph assigned according to a graph coloring process in accordance with certain embodiments of this disclosure.

Turning now to FIG. 4, system 400 is illustrated. System 400 provides for assigning RACH root sequences to AP devices 102 as a function of color 206 of representative vertices 202 of a graph assigned according to a graph coloring process. In some embodiments, operations described herein can be implemented in a network device 402. In some embodiments, operations described herein can be executed by a machine-readable storage medium 404. Machine-readable storage medium 404 can be a non-transitory medium.

For example, network device 402 (and/or machine-readable storage medium 404) can facilitate an operation 406 that identifies access point devices that provide access to a service of a network (e.g., voice or data transmission service or other communication service). For instance, AP devices 102 of area 104 can be identified, which can represent a specific or determined market for a communication network. Network device 402 (and/or machine-readable storage medium 404) can facilitate an operation 408 that can determine minimum distance data representative of a defined minimum distances between two of the access point devices identified at operation 406.

Network device 402 (and/or machine-readable storage medium 404) can facilitate an operation 410 that can generate a graph data structure representative of a graph (e.g., graph 200). This graph can comprise vertices (e.g., vertices 202) that are representative of the access point devices. The graph can further comprise an edge (e.g., edges 204) that is representative of a relationship (e.g., relationship 302) between two adjacent vertices that share the edge.

Network device 402 (and/or machine-readable storage medium 404) can facilitate an operation 412 that can determine colors of the vertices according to a graph coloring process that results in the two adjacent vertices having different colors. In some embodiments, determining colors of the vertices can be a function of the minimum distance data determined at operation 408. In some embodiments, determining colors of the vertices can be a function of communication ranges. As introduced previously, communication range (e.g., coverage area) of an access point device can be employed to determine a number of RACH root sequences that a particular access point device will be assigned and use.

Figure 5:
FIG. 5 illustrates a block diagram of an example table that depicts a number of RACH root sequences assigned as a function of communication range in accordance with certain embodiments of this disclosure.

For example, FIG. 5 provides table 500 that depicts a number of RACH root sequences assigned as a function of communication range. In this example, communication range ranges from approximately one kilometer to approximately 100 kilometers. The associated number of RACH root sequence that are assigned and/or used by an access point device increases with increasing communication range.

Still referring to FIG. 4, network device 402 (and/or machine-readable storage medium 404) can facilitate an operation 414 that can assign RACH root sequences to the access point devices as a function of the colors of associated vertices of the graph. Such assignment can maximize reuse distance of RACH root sequences, while ensuring that neighboring access point devices do not share a RACH root sequence. Such can, advantageously, reduce RACH failures and/or increase RACH success rates as observed by UE.

With particular reference to operations 410, 412, an example graph coloring process or algorithm is provided below, complete with modifications that can enable the graph coloring process to be applicable to assignment of RACH root sequence in a communication network as detailed herein.

(1) Determine a minimum distance, min_dist;

It is understood that min_dist can be representative of minimum distance data 304, which can be determined at operation 408.

(2) Generate a connected graph by marking an AP device as a vertex and defining edges between two AP devices, i and j if:

Distance between AP i and AP j is less than min_dist; or

AP i is in AP j's neighbor list;

It is understood that edges can be defined based on relationship 302 as detailed herein.

(3) Ordering the vertices via a minimum degree vertex elimination process;

(3a) Check if there is a clique with vertices >838. If yes, stop; otherwise go to (3b);

(3b) Find the vertex with lowest degree, order that vertex and eliminate that vertex and associated edges from the graph; and (3c) Update the graph and return to (3a) until all vertices are ordered and/or have been removed from the graph;

It is understood that (3a) represents a stop condition, wherein a clique can be defined as a subset of vertices which forms a complete subgraph, and wherein a complete subgraph is defined as every two distinct vertices are adjacent (e.g., connected by an edge). Additionally or alternatively, the stop condition can be to stop if any vertex has more than 837 edges. It is further understood that network device 402 (and/or machine-readable storage medium 404) can accomplish (3b) by performing an operation comprising, e.g., ordering the vertices according to a lowest degree first scheme, wherein a first vertex of the vertices determined to have a fewest number of edges is first in the ordering. It is also understood that network device 402 (and/or machine-readable storage medium 404) can accomplish (3c) by performing an operation comprising, e.g., updating the graph by removing the first vertex and each edge of the first vertex and repeating the lowest degree first scheme iteratively until all vertices are ordered and/or have been removed from the graph.

(4) Coloring the vertices in a reverse sequence of the ordering (e.g., coloring the vertices with higher degree first) with the consideration that AP devices with a neighbor relationship are to be colored in the way that the assigned color codes are to be separated by at least the predefined neighbor spacing (e.g., determined based on communication range);

(5) Increase min_dist and return to (1).

In accordance with the above process/algorithm, the largest min_dist can be found in which no clique has vertices >838 and/or no vertex has edges >837. The colors assigned to vertices for that graph can be employed to represent RACH root sequence(s) of associated AP devices. In this manner, RACH root sequence reuse can be improved or optimized, which can provide the advantage of reduced RACH access failures.

Example Methods

Figure 6:
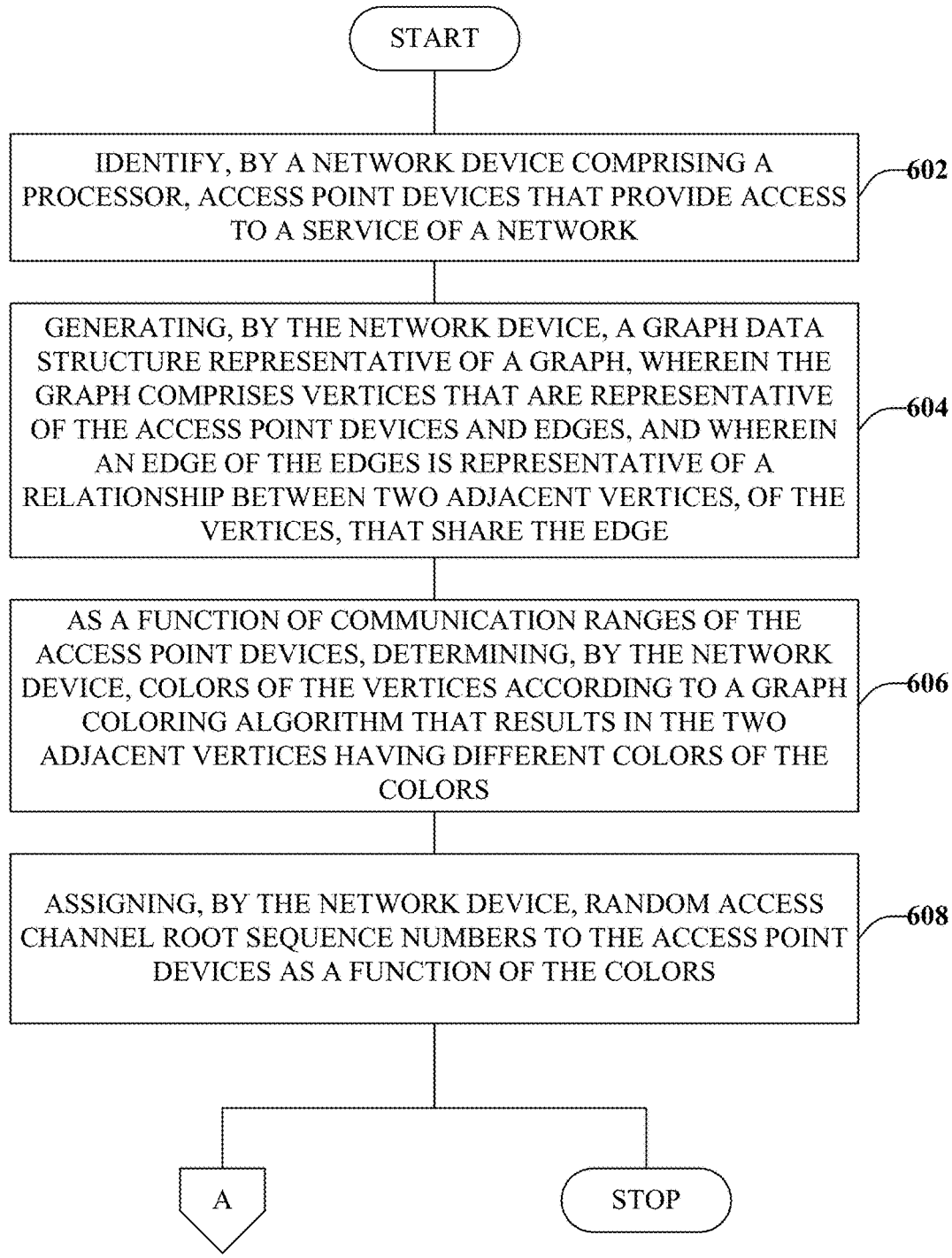
FIG. 6 illustrates an example methodology that can provide for assigning RACH root sequences to AP devices as a function of colors of the representative vertices of a graph that are assigned according to a graph coloring process in accordance with certain embodiments of this disclosure.
Figure 7:
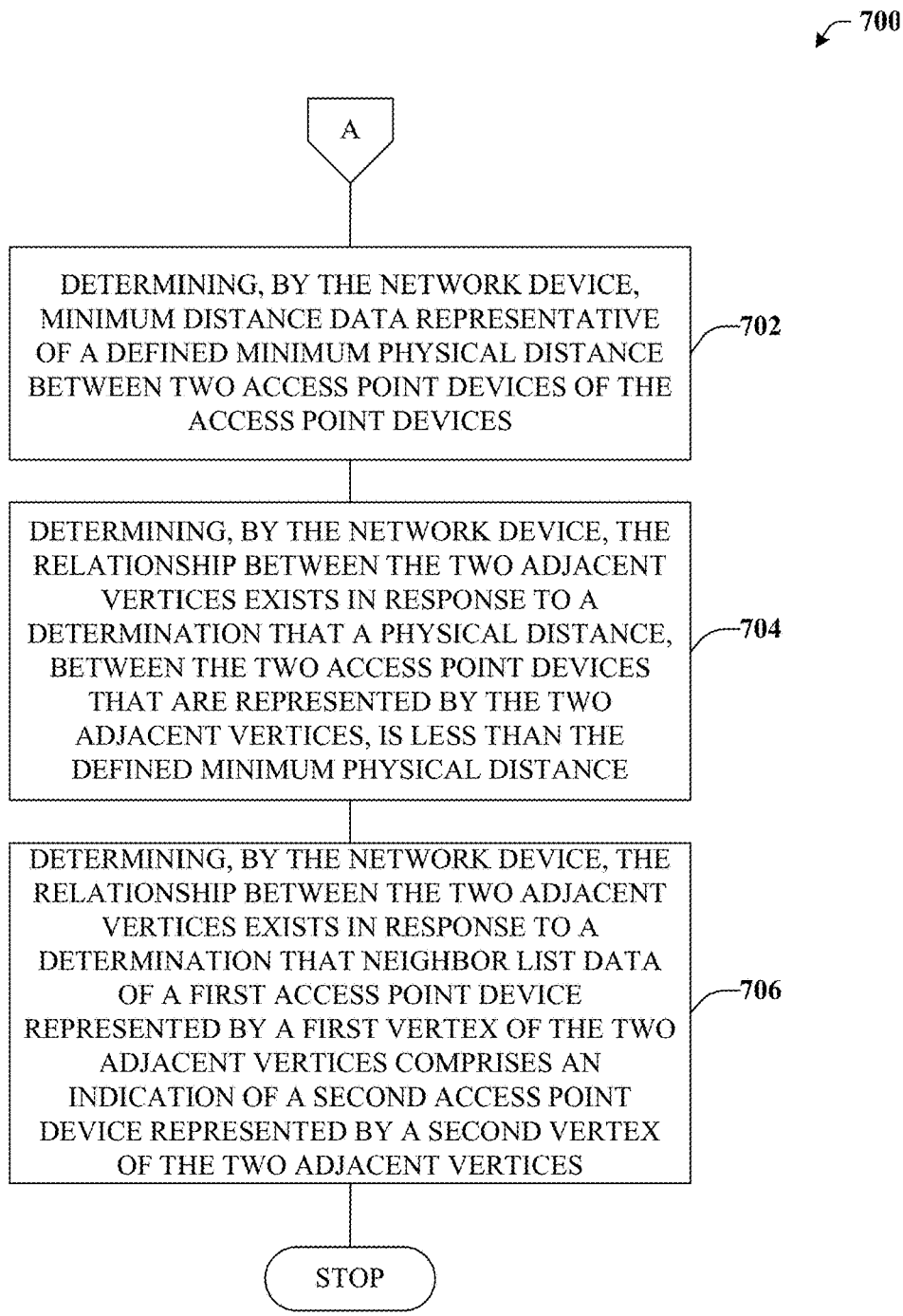
FIG. 7 illustrates an example methodology that can provide for additional elements or aspects in connection with assigning RACH root sequences to AP devices as a function of colors in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can provide for assigning RACH root sequences to AP devices as a function of colors of the representative vertices of a graph that are assigned according to a graph coloring process. For example, at reference numeral 602, a network device (e.g., a core network device) comprising a processor, can identify AP devices that provide access to a service of a network. For example, AP devices within a defined market can be identified.

At reference numeral 604, the network device can generate a graph data structure representative of a graph, wherein the graph comprises vertices that are representative of the access point devices and edges, and wherein an edge of the edges is representative of a relationship between two adjacent vertices, of the vertices, that share the edge.

At reference numeral 606, the network device can determine colors of the vertices according to a graph coloring process that results in the two adjacent vertices having different colors of the colors. In some embodiments, the determining the colors can be determined as a function of communication ranges of the access point devices. In some embodiments, the determining the colors can be determined as a function of minimum distance data that is detailed herein, e.g., with reference to element 702 of FIG. 7.

At reference numeral 608, the network device can assign random access channel root sequence numbers to the access point devices as a function of the colors. Method 600 can proceed to insert A, which is further detailed in connection with FIG. 7, or end.

With reference now to FIG. 7, exemplary method 700 is illustrated. Method 700 can provide for additional elements or aspects in connection with assigning RACH root sequences to AP devices as a function of colors. For example, at reference numeral 702, the network device can generate signed parameter data representing a system information parameter associated with the network device that is cryptographically signed with the private key. The system information parameter(s) signed can be, for example, a system frame number, a current time, a location, a cell ID, and so on. By signing this data, such cannot be modified without detection and must actually match the parameters associated with the network device.

At reference numeral 704, the network device can generate minimum distance data representative of a defined minimum distance between two access point devices of the access point devices. In some embodiments, such minimum distance data can be employed as detailed at reference numeral 606 of FIG. 6.

At reference numeral 706, the network device can determine if the relationship described at reference numeral 604 of FIG. 6 exists. For example, the network device can determine the relationship exists between the two adjacent vertices in response to a determination that neighbor list data of a first access point device represented by a first vertex of the two adjacent vertices comprises an indication of a second access point device represented by a second vertex of the two adjacent vertices. Additionally or alternatively, the network device can determine the relationship exists if a physical distance between the first access point device and the second access point device is less than the defined minimum distance.

Example Operating Environments

Figure 8:
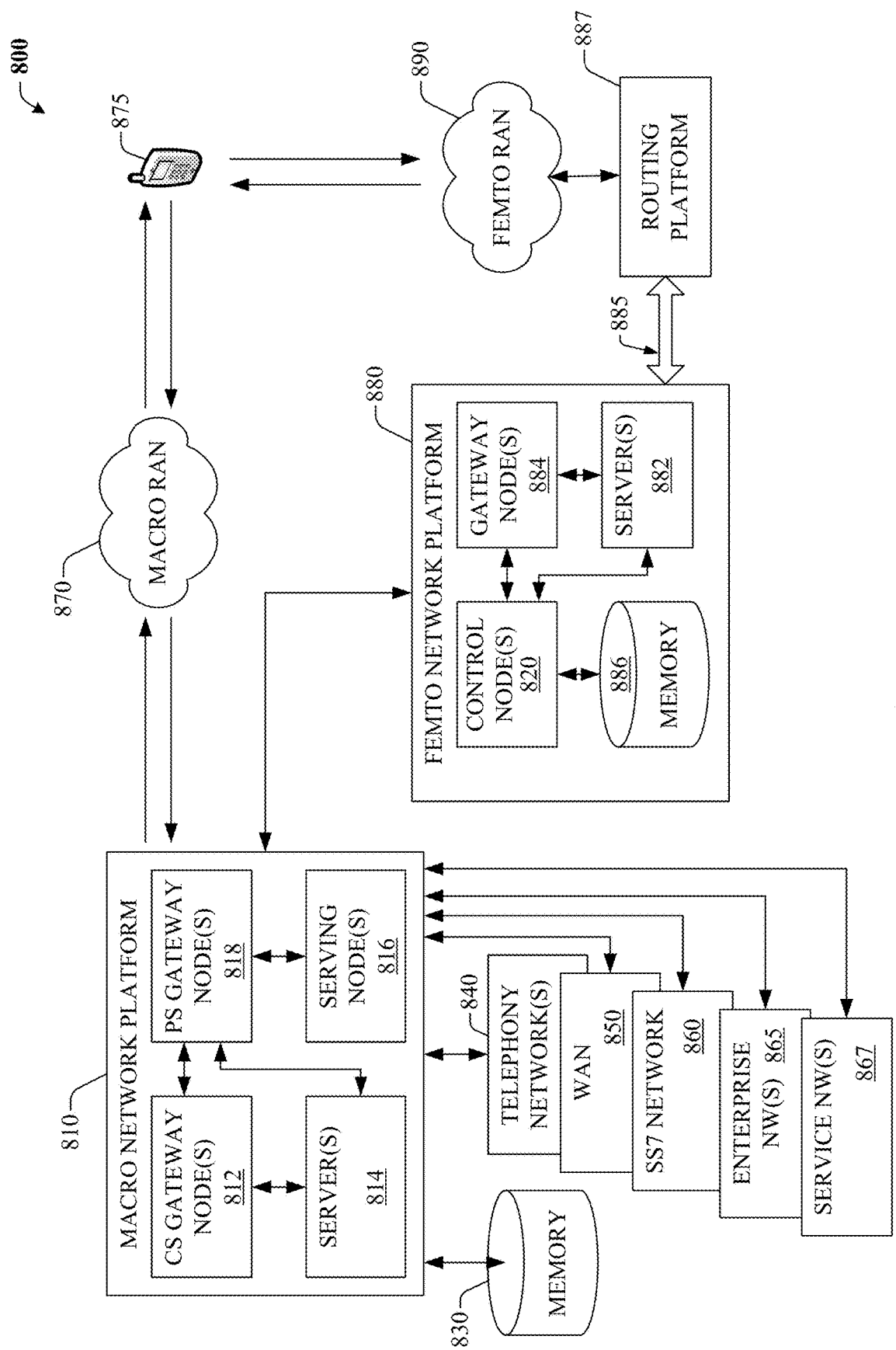
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication) with user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 810 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 870 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/ authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network(s) 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
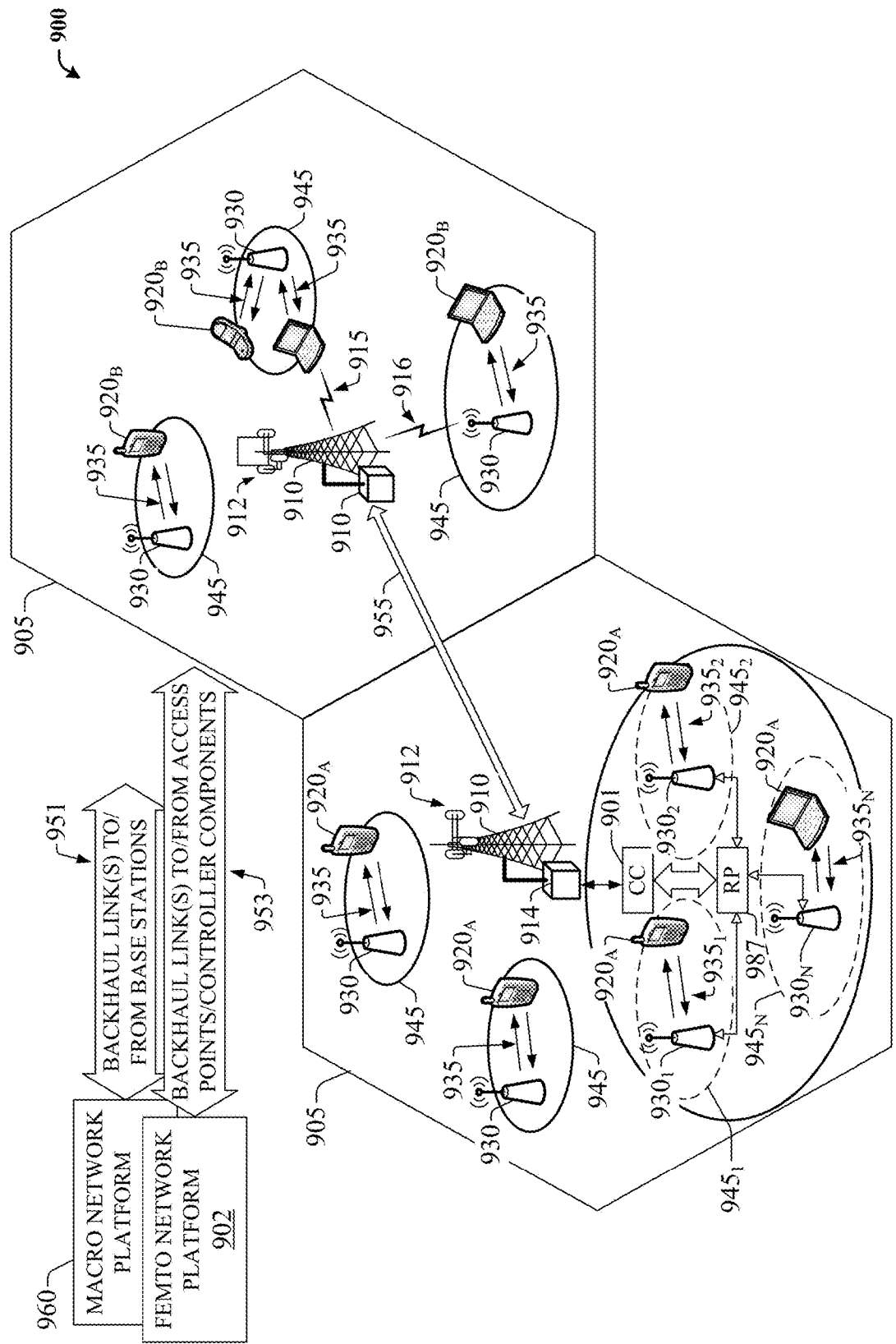
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE $920_A$, $920_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE $920_A$, $920_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs 920$_A$ can be routed by the RP 987, for example, internally, to another UE 920$_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points 930$_1$-930$_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE 920$_A$ connected to femto APs 930$_1$-930$_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas 912$_1$-912$_N$. It should be appreciated that while antennas 912$_1$-912$_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
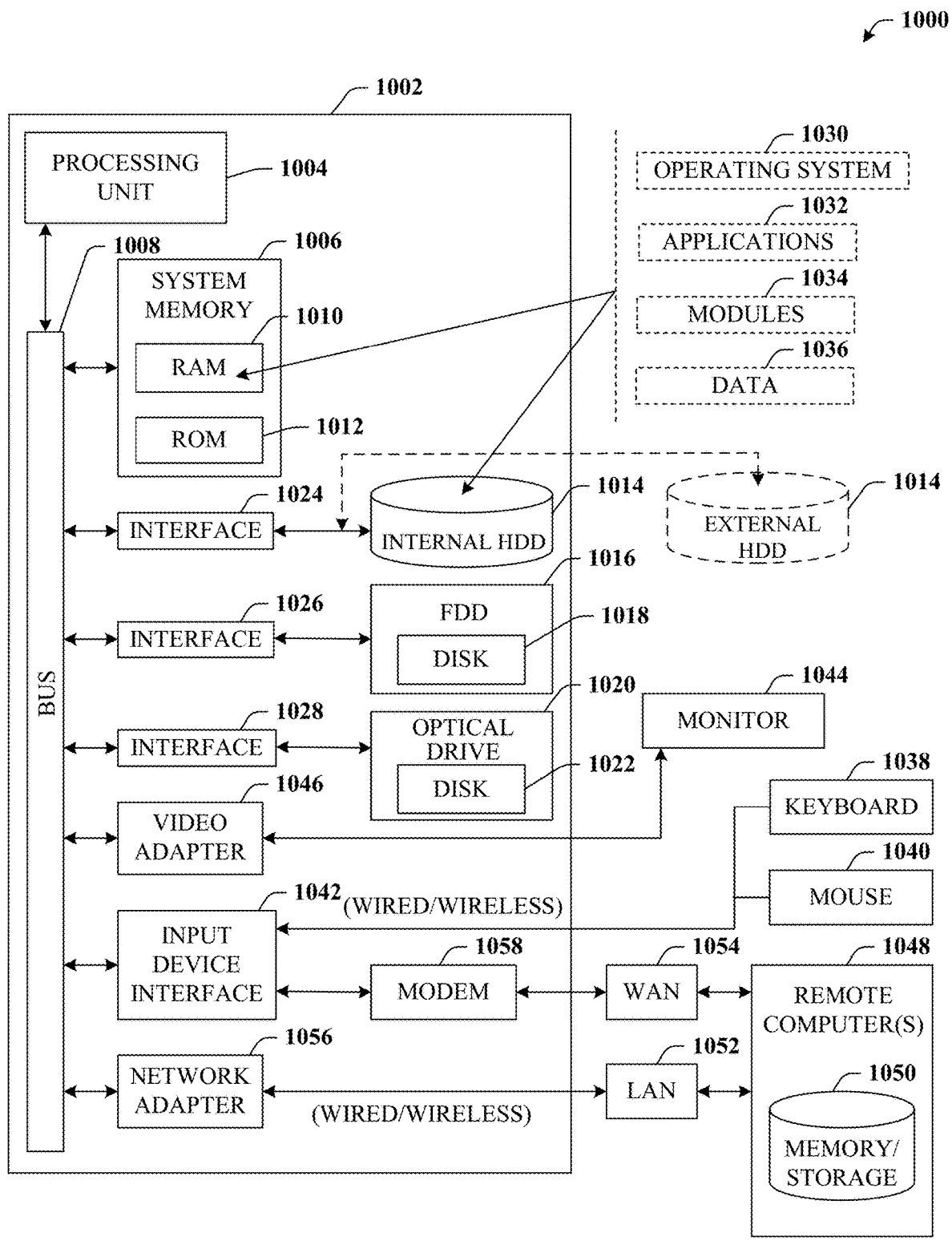
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various aspects of the disclosed subject matter, FIG. 10 and the following discussion are intended to provide a brief, general description of a suitable computing environment 1000 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 10, the exemplary environment 1000 for implementing various aspects of the disclosed subject matter comprises a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also comprise a high-speed RAM such as static RAM for caching data.

The computer 1002 further comprises an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the disclosed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may comprise a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically comprises other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also comprise a wireless access point disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A network device, comprising:
 a processor; and
 a memory that stores executable instructions that, when executed by the processor, facilitate performance of operations, comprising:
  identifying access point devices that provide access to a service of a network;
  generating a graph data structure representative of a graph, wherein the graph comprises vertices that are representative of the access point devices and edges, and wherein an edge of the edges is representative of a relationship between two adjacent vertices, of the vertices, that share the edge and represent two access point devices of the access point devices;
  determining colors of the vertices according to a graph coloring that results in the two adjacent vertices having no common colors of the colors, wherein a vertex of the two adjacent vertices is assigned m colors, wherein m is greater than one, and wherein m is determined based on a communication range of an associated access point device being greater than a defined value; and assigning random access channel root sequence numbers to the access point devices as a function of the colors, resulting in assigned random access channel root sequence numbers, wherein the two access point devices represented by the two adjacent vertices are assigned no common random access channel root sequence number, and wherein the assigned random access channel root sequence numbers are used by the access point devices to serve mobile wireless devices for wireless communications.

2. The network device of claim 1, wherein the operations further comprise determining minimum distance data representative of a defined minimum distance between the two access point devices of the access point devices.

3. The network device of claim 2, wherein the relationship between the two adjacent vertices exists in response to a determination that a physical distance, between the two access point devices that are represented by the two adjacent vertices, is less than the defined minimum distance.

4. The network device of claim 1, wherein the access point devices comprise a first access point device and a second access point device, and wherein the relationship between the two adjacent vertices exists in response to a determination that neighbor list data of the first access point device represented by a first vertex of the two adjacent vertices comprises an indication of the second access point device represented by a second vertex of the two adjacent vertices.

5. The network device of claim 1, wherein the operations further comprise ordering the vertices according to a lowest degree first scheme, and wherein a first vertex of the vertices determined to have a fewest number of edges is first in the ordering.

6. The network device of claim 5, wherein the operations further comprise updating the graph by removing the first vertex and each edge of the first vertex and repeating the lowest degree first scheme iteratively until all vertices are ordered.

7. The network device of claim 5, wherein the determining the colors of the vertices comprises determining the colors according to a highest degree first scheme, and wherein a first color of the colors is assigned to a last vertex of the vertices determined to be last in the ordering.

8. A non-transitory machine-readable storage medium, comprising executable instructions that, when executed by a processor, facilitate performance of operations, comprising:
determining minimum distance data representative of a defined minimum physical distance allowed between two access point devices of a group of access point devices that provide access to a service of a network;
generating a graph data structure representative of a graph, wherein the graph comprises vertices, adjacent vertices, and edges, and wherein the vertices are representative of the group of access point devices, the adjacent vertices are representative of a pair of vertices, of the vertices, that are joined by an edge of the edges, and the edge is representative of a relationship between a pair of access point devices that are represented by the pair of vertices;
as a function of the minimum distance data, determining a color, from the colors, of a vertex, from the pair of vertices, according to a graph coloring process that results in the color of the vertex being different from adjacent vertices that share an edge with the vertex, wherein the vertex is assigned multiple colors, wherein a number of the multiple colors is determined based on a communication range of an associated access point device being greater than a defined value, and wherein each of the multiple colors differ from other colors assigned to the adjacent vertices; and
assigning a random access channel root sequence number to the associated access point device for each one of the multiple colors, resulting in the associated access point device being assigned multiple random access channel root sequence numbers that differ from other random access channel root sequence numbers assigned to other access point devices of the group that are within the defined minimum physical distance from the associated access point device,
wherein the assigned random access channel root sequence numbers are used by the access point devices to serve wireless devices in a wireless environment.

9. The non-transitory machine-readable storage medium of claim 8, wherein the assigning the random access channel root sequence number for each one of the multiple colors comprises assigning a sequential series of random access channel root sequence numbers to the associated access point device, and wherein a size of the sequential series is a function of the communication range of the associated access point device.

10. The non-transitory machine-readable storage medium of claim 8, wherein the relationship between the pair of access point devices exists in response to a determination that a physical distance, between the pair of access point devices, represented by the pair of vertices, is less than the defined minimum physical distance.

11. The non-transitory machine-readable storage medium of claim 8, wherein the pair of access point devices comprises a first access point device and a second access point device, and wherein the relationship between the pair of access point devices exists in response to a determination that neighbor list data of the first access point device represented by a first vertex of the pair of vertices comprises an indication of the second access point device represented by a second vertex of the pair of vertices.

12. The non-transitory machine-readable storage medium of claim 8, further comprising ordering the vertices according to a lowest degree first scheme, wherein a first vertex of the vertices determined to have a fewest number of edges is first in the ordering.

13. The non-transitory machine-readable storage medium of claim 12, further comprising updating the graph by removing the first vertex and each edge of the first vertex and repeating the lowest degree first scheme iteratively until all vertices have been removed from the graph.

14. The non-transitory machine-readable storage medium of claim 12, wherein the determining the color of the vertex comprises determining the colors according to a highest degree first scheme, and wherein a first color of the colors is assigned to a last vertex of the vertices determined to be last in the ordering.

15. The non-transitory machine-readable storage medium of claim 8, further comprising increasing the defined minimum physical distance allowed between two access point devices.

16. The non-transitory machine-readable storage medium of claim 15, further comprising repeating the generating the graph data iteratively until a clique of the graph has a number of vertices greater than 838.

17. A method, comprising:
identifying, by a network device comprising a processor, access point devices that provide access to a service of a network;

generating, by the network device, a graph data structure representative of a graph, wherein the graph comprises vertices that are representative of the access point devices and edges, and wherein an edge of the edges is representative of a relationship between two adjacent vertices, of the vertices, that share the edge;

as a function of communication ranges of the access point devices, determining, by the network device, colors of the vertices by graph coloring resulting in a first vertex of the two adjacent vertices being assigned multiple colors of the colors that are distinct from any color of the colors assigned to a second vertex of the two adjacent vertices; and assigning, by the network device, random access channel root sequence numbers to the access point devices as a function of the colors, resulting in assigned random access channel root sequence numbers, wherein a first access point device, represented by the first vertex, is assigned multiple random access channel root sequence numbers that are distinct from any random access channel root sequence number assigned to a second access point device, represented by the second vertex, and wherein the assigned random access channel root sequence numbers are used by the access point devices to serve user equipment for wireless communications.

18. The method of claim 17, further comprising determining, by the network device, minimum distance data representative of a defined minimum physical distance between two access point devices of the access point devices.

19. The method of claim 18, further comprising determining, by the network device, the relationship between the two adjacent vertices exists in response to a determination that a physical distance, between the two access point devices that are represented by the two adjacent vertices, is less than the defined minimum physical distance.

20. The method of claim 17, further comprising determining, by the network device, the relationship between the two adjacent vertices exists in response to a determination that neighbor list data of the first access point device represented by a first vertex of the two adjacent vertices comprises an indication of the second access point device represented by a second vertex of the two adjacent vertices.

* * * * *